United States Patent
Noguchi et al.

(10) Patent No.: US 7,385,361 B2
(45) Date of Patent: Jun. 10, 2008

(54) BALLAST FOR HIGH-PRESSURE DISCHARGE LAMP AND METHOD OF OPERATING THE SAME

(75) Inventors: Toshiyuki Noguchi, Nishinomiya (JP); Yasuhiro Kakimoto, Takatsuki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 391 days.

(21) Appl. No.: 10/556,382

(22) PCT Filed: May 12, 2004

(86) PCT No.: PCT/JP2004/006685

§ 371 (c)(1),
(2), (4) Date: Nov. 10, 2005

(87) PCT Pub. No.: WO2004/103032

PCT Pub. Date: Nov. 25, 2004

(65) Prior Publication Data

US 2007/0018591 A1 Jan. 25, 2007

(30) Foreign Application Priority Data

May 14, 2003 (JP) .............................. 2003-135805

(51) Int. Cl.
*G05F 1/00* (2006.01)

(52) U.S. Cl. ....................... 315/308; 315/307; 315/291; 315/209 R; 315/247; 315/224; 315/360; 315/DIG. 2; 315/DIG. 5; 315/DIG. 7

(58) Field of Classification Search ................. 315/127, 315/128, 224, 225, 247, 209 R, 287, 289, 315/291, 307, 308, 360, 362, DIG. 2, DIG. 5, 315/DIG. 7

See application file for complete search history.

(56) References Cited

U.S. PATENT DOCUMENTS 5,212,428 A 5/1993 Sasaki et al.

(Continued)

FOREIGN PATENT DOCUMENTS

JP 1992-29112 3/1992

(Continued)

*Primary Examiner*—Haissa Philogene
(74) *Attorney, Agent, or Firm*—Hamre, Schumann, Mueller & Larson, P.C.

(57) ABSTRACT

An operating device control section (4) controls an output current of a DC-DC converter (1), and also controls a commutation frequency of a commutator (2) that converts a direct current output from the DC-DC converter into an alternating current. The operating device control section operates a discharge lamp, at the start of lamp operation, with a predetermined voltage value lower than a rated voltage and a first target current value higher than a rated current, then, at an end of a predetermined high frequency start period (T1) elapsed from the start of lamp operation, controls the commutator to switch from a commutation frequency higher than that during a steady lamp operation to a commutation frequency during the steady lamp operation, and then, after a voltage applied to the discharge lamp increases and reaches a voltage not lower than a predetermined threshold voltage (Vth) which is not higher than the rated voltage, controls the DC-DC converter to switch from the first target current value to a second target current value which is not higher than the rated current to operate the discharge lamp. A temperature of a lamp electrode can be increased quickly and sufficiently to reduce a time required to increase the lamp illuminance, thereby reducing a time required to cause video to be viewable.

13 Claims, 11 Drawing Sheets

U.S. PATENT DOCUMENTS

| | | | |
|---|---|---|---|
| 5,481,163 A * | 1/1996 | Nakamura et al. | 315/308 |
| 6,597,131 B2 | 7/2003 | Ito et al. | |
| 6,943,503 B2 * | 9/2005 | Ozasa et al. | 315/224 |
| 2006/0197475 A1 * | 9/2006 | Yamamoto et al. | 315/330 |

FOREIGN PATENT DOCUMENTS

| | | |
|---|---|---|
| JP | 5-054990 | 3/1993 |
| JP | 7-230882 | 8/1995 |
| JP | 11-297482 | 10/1999 |
| JP | 2002-352990 | 12/2002 |

* cited by examiner

BALLAST FOR HIGH-PRESSURE DISCHARGE LAMP AND METHOD OF OPERATING THE SAME

TECHNICAL FIELD

The present invention relates to a ballast for a discharge lamp, such as a high-pressure mercury lamp or the like and a method of operating the same, and is applicable to a projection-type projector system.

BACKGROUND ART

In recent years, the luminance of a projection-type projector has been improved dramatically by adopting a high-efficiency high-pressure discharge lamp (hereinafter simply referred to as a lamp). However, the amount of a substance such as mercury, which is enclosed in the lamp tube, is increased for the purpose of higher efficiency of the lamp, and the impedance increases due to explosive gasification of the enclosed substance, so that the lamp is unstable immediately after the lamp is turned ON. In this situation, when the lamp is repeatedly turned ON and OFF, serious problems arise, such as a degradation in the lamp electrode, circuit destruction caused by an increase in noise due to repeated turning ON, and the like.

As a ballast for a discharge lamp, a low-frequency start type and a high-frequency start type are known.

The low-frequency start type ballast for a discharge lamp performs low-frequency driving to warm two lamp electrodes alternately for several seconds after the start of lamp operation. This type has the following drawback: due to the low frequency, there is a large difference in temperature between one lamp electrode being warmed and the other lamp not being warmed, so that current is likely to be interrupted when the polarity of current is switched. Therefore, the lamp is gradually transitioned to a stable state while the lamp is repeatedly turned ON and OFF, so that a considerably large load is put on the lamp electrodes.

On the other hand, the high-frequency start type ballast for a discharge lamp performs high frequency drive to warm two lamp electrodes equally for several seconds after the start of lamp operation. In this case, the temperature difference between the two electrodes is considerably small due to the high frequency, so that substantially no interruption occurs in lamp current.

Therefore, in the case of this start type, the load on the lamp electrode is considerably small.

FIGS. 10 and 11 are waveform diagrams illustrating temporal changes in a lamp current I (A), a lamp voltage V (V), and a lamp electrode temperature D (° C.) in the low-frequency start type and high-frequency start type ballast for discharge lamps, respectively.

In FIG. 10, the lamp current I (A) has a low-frequency start period of several Hz to several tens of Hz indicated by a period T1 immediately after the start of lamp operation, and this period is typically set to be 2 to 5 seconds. Thus, the conventional ballast for a discharge lamp commutation-drives the lamp current waveform I (A) with a low frequency of several Hz to several tens of Hz immediately after the start of lamp operation, and therefore, is called a low-frequency start type ballast for a discharge lamp. The conventional low-frequency start type ballast for a discharge lamp activates a lamp as follows. In FIG. 10, a breakdown current Id of the lamp current I (A) is increased by further raising a high-voltage pulse at the start of lamp operation as indicated by a period t3 of the lamp voltage V (V), thereby causing the lamp electrode temperature to rise rapidly as indicated by the lamp electrode temperature D (° C.) so as to stabilize the lamp at the start of lamp operation. However, due to the low-frequency start, there is a large difference in temperature between the two lamp electrodes, so that current is likely to be interrupted when the polarity of the current is switched.

As described above, the breakdown current Id through the lamp has a considerably and excessively large value during the unstable period t3 immediately after the start of lamp operation.

In addition, a sudden impedance change due to explosive gasification of a substance, such as mercury or the like, which is enclosed in the lamp, causes repetition of lamp current interruption and breakdown, leading to a degradation in the lamp electrode, circuit destruction due to the repeated breakdown current Id, and the like. On the other hand, the lamp efficiency conventionally is increased by techniques called "tapered electrode" and "short arc (reduced distance between the electrodes)". Therefore, in the current situation, the degradation of the electrode during lamp operation due to the increase of the repeated breakdown current Id is not negligible.

By contrast, recently, a high-frequency start type ballast for a discharge lamp is becoming mainstream, which performs commutation drive with a high frequency (about several tens of kHz) with respect to the lamp current I (A) immediately after the start of lamp operation, and after a high-frequency start period T1, transitions to a period T2 of a steady commutation frequency (about 80 Hz to 400 Hz) appropriate for a lamp, with certain timing, as illustrated in FIG. 11. This high-frequency start period T1 is also typically 2 to 5 seconds as in the low-frequency start type ballast for a discharge lamp.

Concerning the circuit structure of the high-frequency start type ballast for a discharge lamp of FIG. 11, a choke coil having an inductance of about several tens of µH to several hundreds of µH is inserted in series to a lamp. When the lamp is broken down during the high-frequency start period T1, the choke coil provides a high-frequency impedance, thereby advantageously automatically reducing a breakdown current Ia in FIG. 11. However, at the same time, the choke coil serves as a low-pass filter during the high-frequency start period T1. Therefore, the waveform of the lamp current I (A) during the high-frequency start period T1 is a triangular wave (FIG. 11), which is different from the rectangular waveform (FIG. 10) of the lamp current I (A) during the low-frequency start period T1 (after the unstable period t3). As a result, even when a peak current value reaches a rated lamp current during the high-frequency start period T1, the effective value is about half. Therefore, the value of current for warming the lamp electrode immediately after the start of lamp operation is reduced to about half of that of FIG. 10. When an increase in the lamp electrode temperature is not sufficient during the high-frequency start period T1, it is highly likely that the lamp goes out at the timing t1 of switching to the steady commutation frequency period T2.

Further, in the high-frequency start type ballast for a discharge lamp, the relatively intermediate-size choke coil is driven by high-frequency switching during the high-frequency start period T1 of several tens of kHz, and therefore, a considerably large amount of magnetic flux energy is held in the choke coil. Therefore, with the timing t1 of switching from the high-frequency start period T1 to the steady commutation frequency period T2 of several tens of Hz to several hundreds of Hz appropriate for a lamp, a considerably large amount of excessively large current Ib flows due to a counter electromotive voltage occurring since the choke coil holds the magnetic flux, as illustrated in FIGS. 11 and 12, in part because a combined impedance of the lamp and the choke coil suddenly decreases. As a result, the lamp electrode is degraded. Here, FIG. 12 is a waveform diagram of the lamp current I (A) of the conventional high-frequency start type ballast for a discharge lamp, in which the lamp current I (A) is attenuated to zero after the timing t1 of switching from the high-frequency start period T1 to the commutation frequency period T2, so that the lamp goes out.

Although the above-described low-frequency start type ballast for a discharge lamp and high-frequency start type ballast for a discharge lamp each are used as a light source for a projector, it takes about one minute for the lamp illuminance to be increased to about 60% or more with which video can be viewed. Thus, it takes a considerably long time for video to be viewable, resulting in inconvenience to the user.

Here, FIG. 7 is a graph illustrating characteristics of an increase in illuminance versus a time elapsed from the start of lamp operation in the high-frequency start type ballast for a discharge lamp. Open triangles indicate a plot of the illuminance increase characteristics of a conventional example. It can be confirmed from FIG. 7 that it takes one minute or more for the lamp illuminance to be increased to about 60% or more in the conventional high-frequency start type ballast for a discharge lamp.

Therefore, the conventional high-frequency start type ballast for a discharge lamp has the following problems.

1. Concerning lamp operation for a projector, although they are video devices, it takes a considerably long time for the illuminance of the lamp to be increased, so that the user needs to wait for a considerably long time until the user can view video.

2. During the high-frequency start period, the effective lamp current value is half of that of the low-frequency start, so that the lamp electrode cannot be warmed sufficiently immediately after the start of lamp operation.

3. The lamp electrode is degraded due to an excessively large current occurring-when the control state is transitioned from the high frequency start period (high impedance period) to the steady frequency period (low impedance period).

DISCLOSURE OF INVENTION

The present invention is provided to solve the above-described problems. An object of the present invention is to provide a novel method for increasing the temperature of a lamp electrode quickly and sufficiently, thereby reducing the time required to increase the illuminance of a lamp and reducing a time required to cause video to be viewable.

Another object of the present invention is to stabilize the lamp operation starting state of a lamp to prevent a lamp electrode from being degraded due to an excessively large lamp current caused by a change in lamp control frequency, thereby prolonging the lamp life.

To achieve the objects, a ballast for a discharge lamp according to the present invention comprises a direct current power source, a DC-DC converter for DC-DC converting a current from the direct current power source, a commutator for converting a direct current output from the DC-DC converter into an alternating current, a discharge lamp supplied with the alternating current from the commutator, and an operating device control section for controlling an output current of the DC-DC converter, and controlling a commutation frequency of the commutator.

The operating device control section operates the discharge lamp, at the start of operating the discharge lamp, with a predetermined voltage value lower than a rated voltage (Vr) of the discharge lamp and a first target current value (Ic1) higher than a rated current (Ir) of the discharge lamp, then, at an end of a predetermined high frequency start period (T1) elapsed from the start of operating the discharge lamp, controls the commutator to switch from a commutation frequency higher than that during a steady lamp operation to a commutation frequency during the steady lamp operation, and then, after a voltage applied to the discharge lamp increases and reaches a voltage not lower than a predetermined threshold voltage (Vth) not higher than the rated voltage of the discharge lamp, controls the DC-DC converter so that the first target current value is switched to a second target current value (Ic2) not higher than the rated current of the discharge lamp.

With this structure, concerning a projector lamp operation, it is possible to increase the temperature of a lamp electrode quickly and sufficiently to reduce a time required to increase the lamp illuminance, thereby reducing the time required to cause video to be viewable.

Preferably, the operating device control section controls the DC-DC converter so that a current flowing through the discharge lamp has a third target current value (Ic3) not higher than the second target current value, irrespective of information about a value of the current flowing through the discharge lamp and a value of the voltage applied to the discharge lamp, at a time of switching the commutation frequencies.

With this structure, it is possible to prevent the occurrence of a degradation in a lamp electrode itself due to an excessively large lamp current when a control state is transitioned from a high frequency start period (high impedance period) to a steady frequency period (low impedance period), thereby prolonging the lamp life.

Preferably, the operating device control section sets the first target current value to be twice or more higher than the second target current value. Thereby, it is possible to warm the lamp electrode sufficiently during the high frequency start period immediately after the start of lamp operation.

The commutator may comprise a current detecting section for detecting a current flowing through the discharge lamp and a voltage detecting section for detecting the voltage applied to the discharge lamp. The operating device control section comprises a valiable-gain amplification section for switching gains and amplifying a voltage corresponding to the current detected by the current detecting section, a comparator for comparing the voltage detected by the voltage detecting section with a reference voltage corresponding to the predetermined threshold voltage (Vth), and outputting a gain control signal to the variable-gain amplification section, depending on a result of comparison, a computation section for receiving output signals from the variable-gain amplification section and the voltage detecting section, and performing a computation so that a current optimal to the voltage applied to the discharge lamp flows through the discharge lamp, and a PWM control section for outputting a signal for performing a pulse width modulation (PWM) control with respect to the DC-DC converter, depending on an output signal from the computation section. When the voltage detected by the voltage detecting section is not lower than the reference voltage, the comparator outputs a gain control signal for increasing the gain of the variable-gain amplification section.

With this structure, when the voltage detected by the voltage detecting section is not lower than the reference voltage, the computation section is caused to determine that a large amount of lamp current flows, and reduce the duty ratio of a pulse in the PWM control section so as to reduce the lamp current.

The computation section may comprise a timer for measuring a time elapsed from the start of operating the lamp. The predetermined high frequency start period measured with the timer may be set for each discharge lamp individually, depending on a rating of the discharge lamp.

The predetermined threshold voltage may be set for each discharge lamp individually, depending on a rating of the discharge lamp.

The ballast for a discharge lamp further may comprise a discharge lamp cooling device. The operating device control section may stop the discharge lamp cooling device until the voltage applied to the discharge lamp reaches the predetermined threshold voltage.

With this structure, the lamp electrode can be warmed rapidly, thereby making it possible to reduce the time required to increase the lamp illuminance.

To achieve the above-described objects, the present invention provides a method of operating a discharge lamp steadily with high frequency start, comprising the steps of causing the discharge lamp to operate, at the start of operating the discharge lamp, with a predetermined voltage value lower than a rated voltage (Vr) of the discharge lamp and a first target current value (Ic1) higher than a rated current (Ir) of the discharge lamp; and switching, at an end of a predetermined high frequency start period elapsed from the start of operating the discharge lamp, from a commutation frequency higher than that during a steady lamp operation to a commutation frequency during the steady lamp operation, and then, after a voltage applied to the discharge lamp increases and reaches a voltage not lower than a predetermined threshold voltage (Vth) lower than the rated voltage of the discharge lamp, switching the first target current value to a second target current value (Ic2) not higher than the rated current of the discharge lamp.

With this method, concerning a projector lamp operation, it is possible to increase the temperature of a lamp electrode quickly and sufficiently to reduce a time required to increase the lamp illuminance, thereby reducing the time required to cause video to be viewable.

The method of operating a discharge lamp of the present invention further may comprise performing a control so that a current flowing through the discharge lamp has a third target current value (Ic3) not higher than the second target current value, irrespective of information about a value of the current flowing through the discharge lamp and a value of the voltage applied to the discharge lamp, at a time of switching the commutation frequencies.

With this method, it is possible to prevent the occurrence of a degradation in a lamp electrode itself due to an excessively large lamp current when a control state is transitioned from a high frequency start period (high impedance period) to a steady frequency period (low impedance period), thereby prolonging the lamp life.

Preferably, the first target current value is set to be twice or more higher than the second target current value. Thereby, it is possible to warm the lamp electrode sufficiently during the high frequency start period immediately after the start of lamp operation.

The predetermined high frequency start period may be set for each discharge lamp individually, depending on a rating of the discharge lamp.

The predetermined threshold voltage may be set for each discharge lamp individually, depending on a rating of the discharge lamp.

The method of operating a discharge lamp of the present invention further may comprise stopping cooling of the discharge lamp until the voltage applied to the discharge lamp reaches the predetermined threshold voltage.

With this method, the lamp electrode can be warmed rapidly, thereby making it possible to reduce a time required to increase the lamp illuminance.

DESCRIPTION OF THE INVENTION

Hereinafter, preferred embodiments of the present invention will be described with reference to the accompanying drawings.

Embodiment 1

Figure 1:
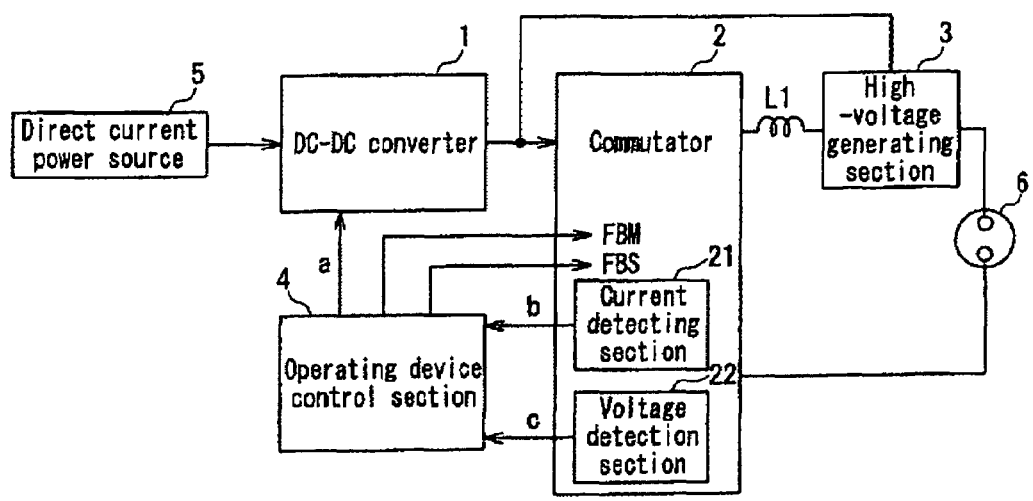
FIG. 1 is a circuit block diagram illustrating an exemplary structure of a ballast for a discharge lamp according to Embodiment 1 of the present invention.

FIG. 1 is a circuit block diagram illustrating an exemplary structure of a ballast for a discharge lamp according to Embodiment 1 of the present invention. In FIG. 1, the ballast for a discharge lamp of Embodiment 1 of the present invention is composed of a direct current power source 5, a DC-DC converter 1 for DC-DC converting a current from the direct current power source 5 to generate a current that is to flow through a lamp 6, a commutator 2 for converting an output current (direct current) from the DC-DC converter 1 into an alternating current, a high-voltage generating section 3 for generating a high-voltage pulse that causes the lamp 6 to be broken down at the start of lamp operation, an operating device control section 4 for controlling an output current and an output voltage of the DC-DC converter 1 and a commutation frequency of the commutator 2, a choke coil L1 for reducing a time required to reverse the polarity of a lamp current, and the lamp 6, which is a high-efficiency and high-pressure discharge lamp.

The commutator 2 is composed of a full-bridge circuit section, which is its major circuit component, a current detecting section 21, and a voltage detecting section 22. The commutator 2 performs a DC/AC inverter operation in which a direct current output from the DC-DC converter 1 is converted into an alternating current based on a full-bridge circuit driving master signal FBM, which is a rectangular wave signal reversed with a predetermined programmed frequency, and a slave signal FBS, which operates in a phase reverse to that of the master signal FBM. The master signal FBM and the slave signal FBS are supplied from the operating device control section 4. At the same time, the commutator 2 also has a function to feed a lamp current value signal b from the current detecting section 21, and a lamp voltage value signal c from the voltage detecting section 22, back to the operating device control section 4.

Figure 2:
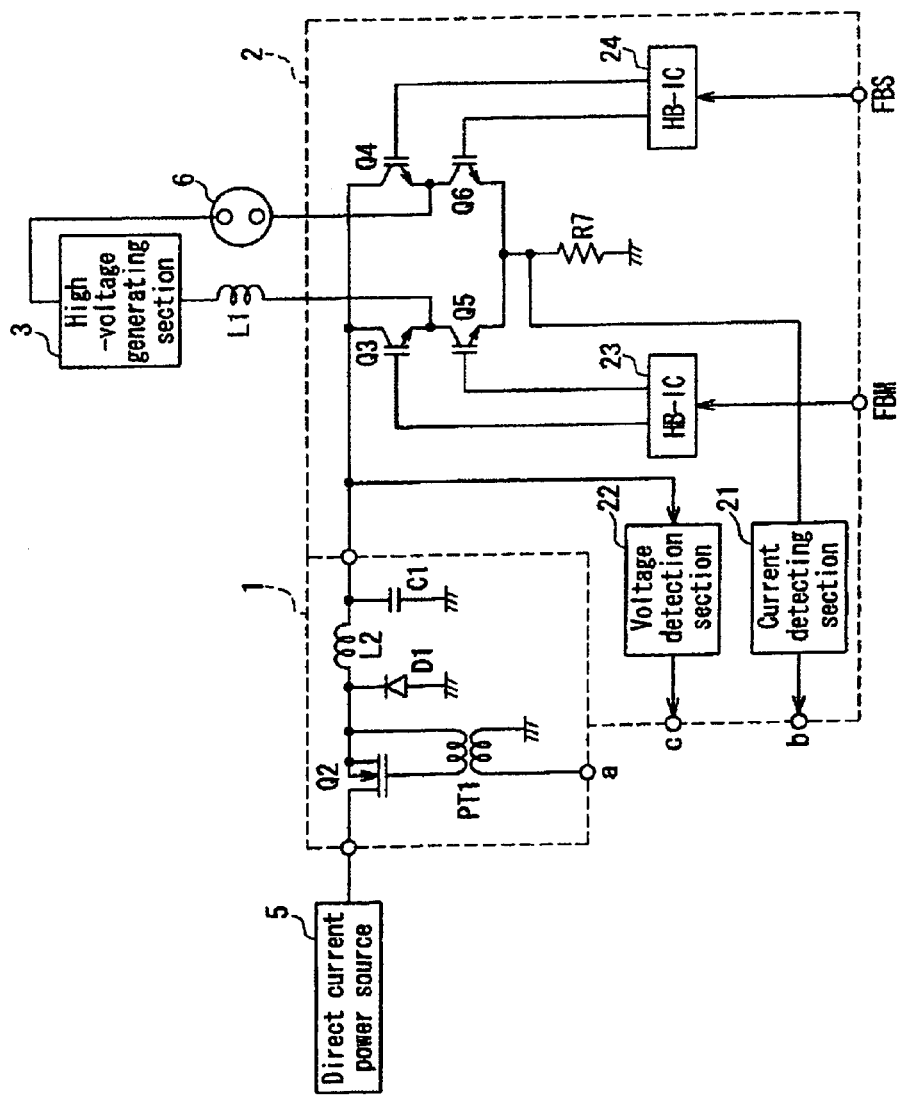
FIG. 2 is a circuit diagram illustrating an exemplary internal structure of a DC-DC converter 1 and a commutator 2 of FIG. 1.

FIG. 2 is a circuit diagram illustrating an exemplary internal structure of the DC-DC converter 1 and the commutator 2. In FIG. 2, the DC-DC converter 1 is composed of a switching element (in FIG. 2, a power MOSFET) Q2, a pulse transformer PT1, a diode D1, a coil L2, and a capacitor C1. The pulse transformer PT1 receives a pulse width control signal a from the operating device control section 4 at the primary coil thereof, and outputs a signal that turns ON/OFF the switching element Q2 at a predetermined duty ratio from the secondary coil thereof. When the switching element Q2 is turned from ON to OFF, a current flows from a ground potential via the diode D1 and the coil L2 to the capacitor C1, so that the capacitor C1 is charged. The coil L2 and the capacitor C1 constitute a low-pass filter, so that a direct current obtained by averaging a pulse current generated by a chopper operation of the pulse transformer PT1 and the switching element Q2 is output from the DC-DC converter 1.

The commutator 2 is composed of a full-bridge circuit section including switching elements (in FIG. 2, isolation gate-type bipolar transistors (IGBTs)) Q3, Q4, Q5, and Q6, a current detection resistor R7, and half-bridge driver ICs (HB-IC) 23 and 24, the current detecting section 21, and the voltage detecting section 22. The switching elements Q3, Q4, Q5, and Q6 are controlled based on the full-bridge circuit driving master signal FBM and slave signal FBS supplied from the operating device control section 4 to convert a direct current output from the DC-DC converter 1 into an alternating current. The alternating current thus converted is supplied via the choke coil L1 and the high-voltage generating section 3 to the lamp 6.

Next, an exemplary structure of the operating device control section 4 will be described with reference to FIG. 3. In the operating device control section 4, the lamp current value signal b fed back from the current detecting section 21 of the commutator 2 is input to an operational amplifier OP1. The lamp current value signal b is gained up by a gain G determined by resistors R1, R2, and R3 and a transistor Q1 to generate a signal b2, which in turn is input to a computation section 41 composed of a microcomputer or the like. Here, the operational amplifier OP1 and the resistors R1, R2, and R3, and the transistor Q1 constitute a variable-gain amplification section. Also, the lamp voltage value signal c fed back from the voltage detecting section 22 of the commutator 2 is input via an the operational amplifier OP2 (resultant signal c2) to a comparator Comp and the computation section 41. The comparator Comp has an open collector structure. When the output signal c2 of the operational amplifier OP2 exceeds a reference voltage determined by resistors R4 and R5, an output d of the comparator Comp goes OFF (=HIGH output), so that the transistor Q1 performs self-bias ON due to a pull-up resistor R6. Conversely, when the output signal c2 of the operational amplifier OP2 becomes lower than the reference voltage determined by the resistors R4 and R5, the output d of the comparator Comp goes ON (=LOW output), so that the transistor Q1 is turned OFF.

The computation section 41 is programmed so as to output a signal p while comparing the signal b2 fed back from the current detecting section 21 with the lamp voltage value signal c2 so that a lamp current value optimal to a current lamp voltage is obtained. The signal p output from the computation section 41 is input to a PWM control section 42, which generates an output signal a for performing a pulse width modulation control (hereinafter referred to as a PWM control) with respect to the DC-DC converter 1, whereby the lamp current is controlled.

Figure 3:
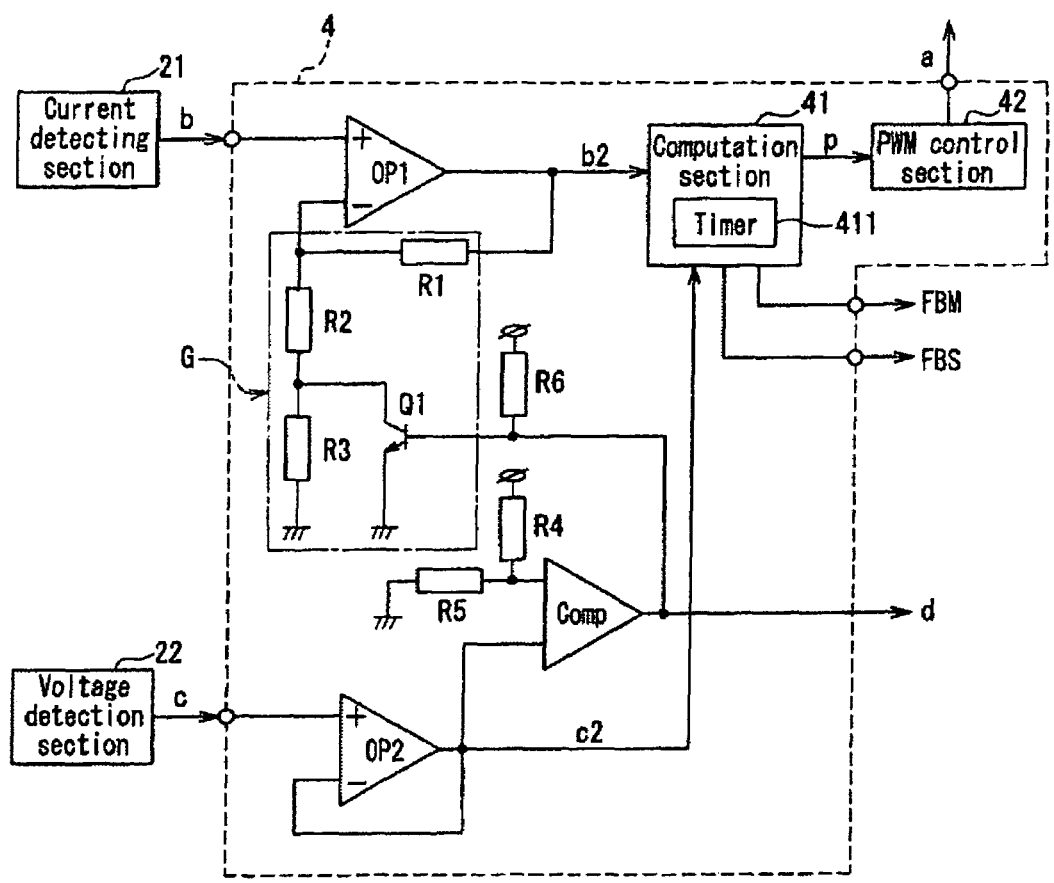
FIG. 3 is a circuit diagram illustrating an exemplary internal structure of an operating device control section 4 of FIG. 1.
Figure 4:
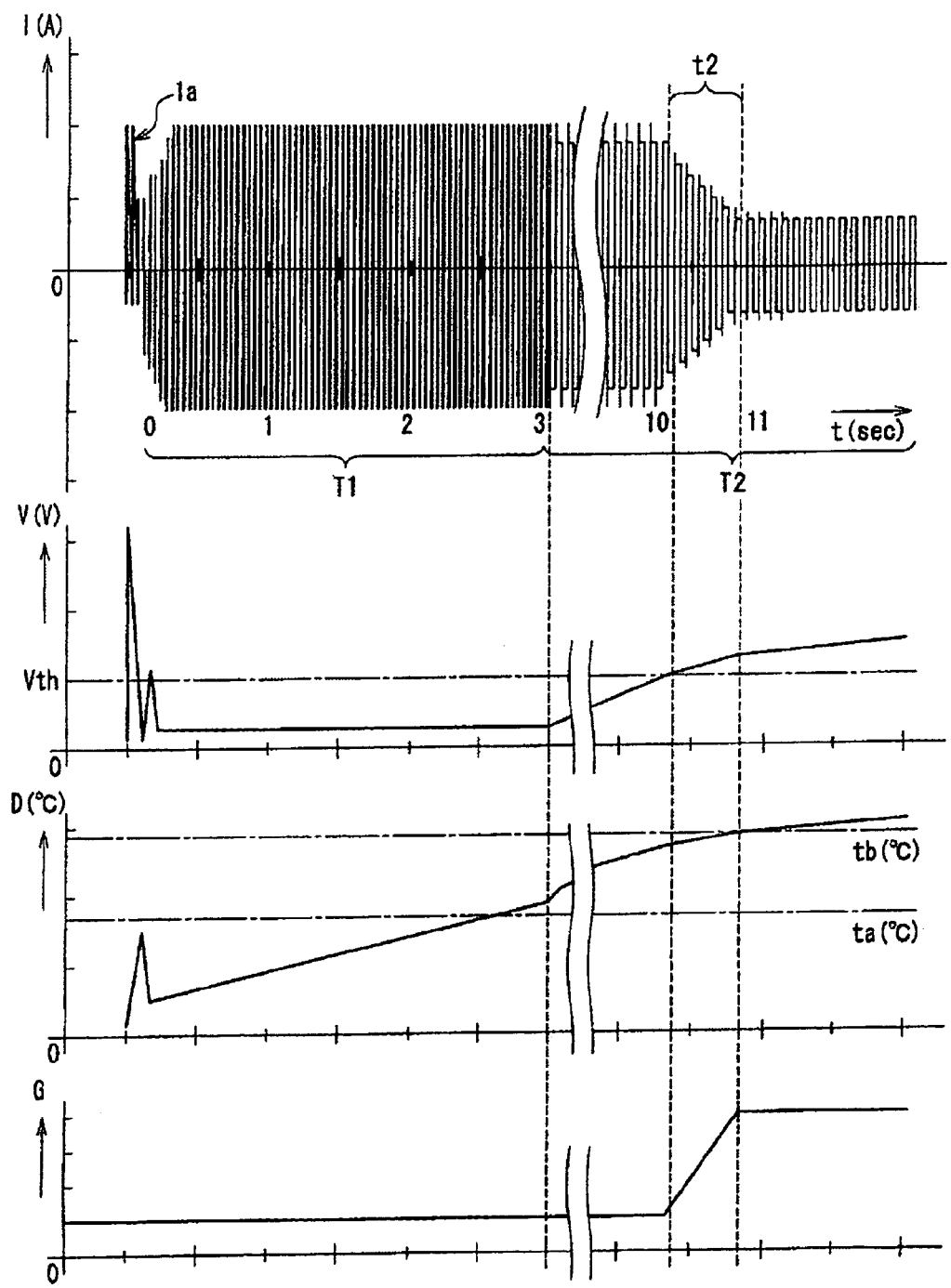
FIG. 4 is a waveform diagram indicating changes in a lamp current I (A), a lamp voltage V (V), a lamp electrode temperature (° C.), and a variable-gain amplification section gain G, after the start of lamp operation in the ballast for a discharge lamp of Embodiment 1 of the present invention.
Figure 11:
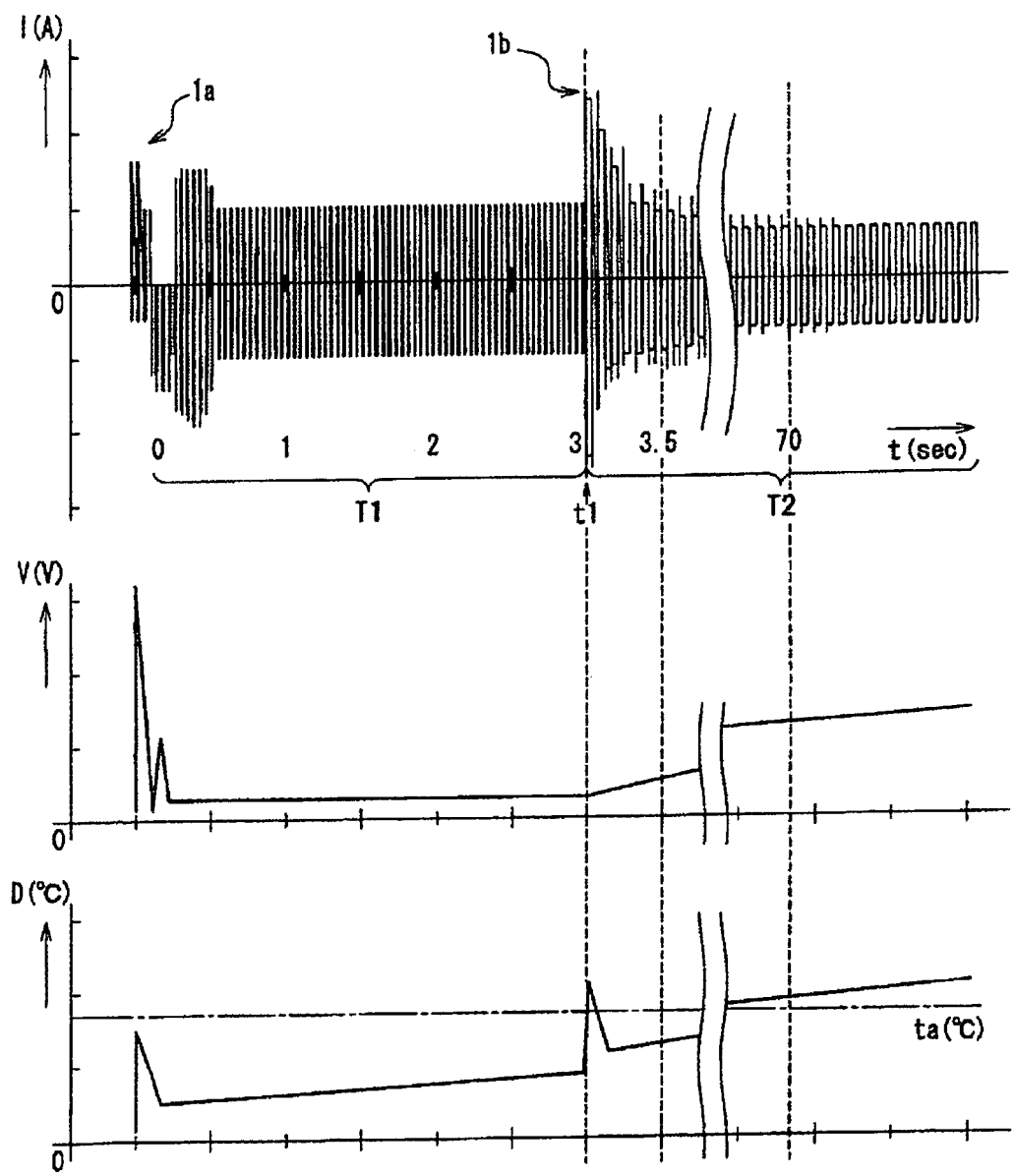
FIG. 11 is a waveform diagram illustrating temporal changes in a lamp current I (A), a lamp voltage V (V), and a lamp electrode temperature (° C.) after the start of lamp operation in a conventional high-frequency start type ballast for a discharge lamp.

By adding the structure of the operating device control section 4 illustrated in FIG. 3 to the conventional high frequency ballast for a discharge lamp, the current waveform I (A) at the start of lamp operation that is obtained by the conventional high-frequency start type ballast for a discharge lamp of FIG. 11 can be caused to be the current waveform I (A) at the start of lamp operation that is obtained by the ballast for a discharge lamp of Embodiment 1 of FIG. 4.

Next, a specific time-series operation will be described with reference to FIG. 4. FIG. 4 illustrates a lamp start waveform of the ballast for a discharge lamp of Embodiment 1, where I (A) indicates a lamp current waveform, V (V) indicates a lamp voltage waveform, D (° C.) indicates a lamp electrode temperature, and G indicates a gain of the operating device control section 4.

Initially, when an external signal for starting a lamp is input to the operating device control section 4, the operating device control section 4 generates the full-bridge circuit driving master signal FBM and slave signal FBS of several tens of KHz to drive the commutator 2 with a high frequency of several tens of KHz. At the same time, a high-voltage pulse is generated from the high-voltage generating section 3. The high-voltage pulse causes a breakdown phenomenon that destroys insulation between the lamp electrodes of the lamp 6, so that the lamp 6 starts operating.

Figure 10:
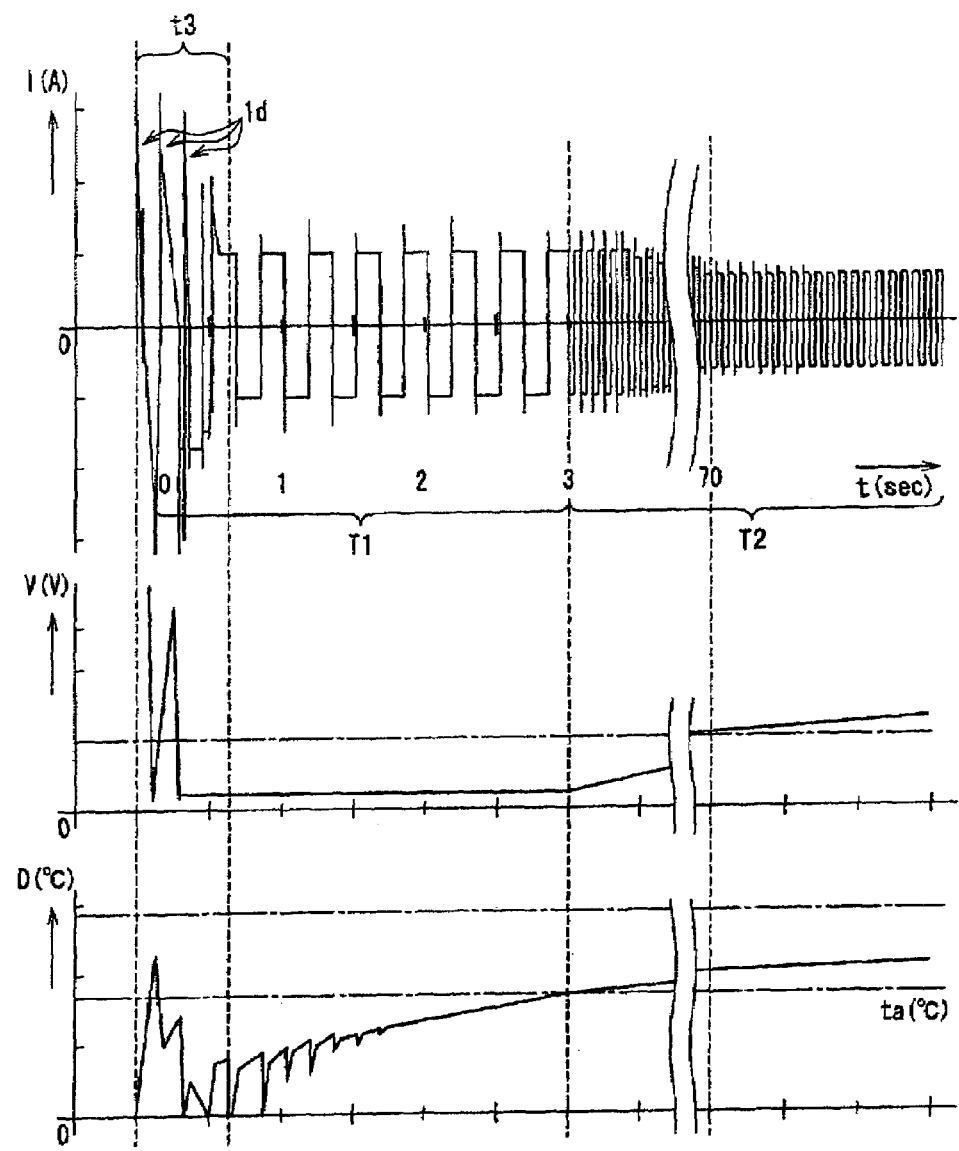
FIG. 10 is a waveform diagram illustrating temporal changes in a lamp current I (A), a lamp voltage V (V), and a lamp electrode temperature (° C.) after the start of lamp operation in a conventional low-frequency start type ballast for a discharge lamp.

At this time, a breakdown current (Ia) is about half of the breakdown current Id of the low-frequency start type ballast for a discharge lamp of FIG. 10 (conventional example) due to an inductance that is a major component of the high-voltage generating section 3, resulting in a reduced load on the electrode of the lamp 6. This point is similar to that of the high frequency ballast for a discharge lamp of FIG. 11 (conventional example).

Next, as a feature of Embodiment 1 of the present invention, a lamp start current value has a peak current value about twice or more higher than that of the start current I (A) of the conventional high-frequency start type ballast for a discharge lamp of FIG. 11, as illustrated with the lamp start current waveform I (A) in FIG. 4. Thereby, the lamp electrode temperature D (° C.) of FIG. 4 can be increased with substantially the same speed as that of the lamp electrode temperature D (° C.) of FIG. 10 (conventional example).

During a period T1 immediately after the start of lamp operation, the lamp voltage value signal c fed back from the voltage detecting section 22 of the commutator 2, which has a considerably low value, is input via the operational amplifier OP2 (resultant signal C2) to the comparator Comp and the computation section 41. Since the output signal c2 of the operational amplifier OP2 is lower than the reference voltage determined by the resistors R4 and R5, the output d of the comparator Comp goes ON (=LOW output). Therefore, the transistor Q1 is turned OFF, so that an output of the operational amplifier OP1 is set to be a gain G (G=(R1/(R2+R3))+1) determined by the resistors R1, R2, and R3. Here, when the value of the resistor R3 is set to be sufficiently large, the gain G is substantially one, so that the lamp current value signal b fed back from the current detecting section 21 of the commutator 2 is input to the computation section 41 without being gained up. Therefore, the computation section 41 detects a lamp current feedback value b2 that is excessively lower than a first target current value, so that the PWM control section 42 is controlled so that a larger amount of lamp current flows.

When the lamp current reaches the first target current value, the computation section controls the target value so that the target value is maintained. Here, in Embodiment 1, the first target current value is defined as being about twice higher than a current value during the high-frequency start period T1 of the conventional high frequency start device of FIG. 11, and the computation section controls a lamp current so that the lamp current is maintained about twice higher than the current value during the high frequency start period of the conventional high frequency start device. Note that the first target current value corresponds to a current not smaller than a predetermined rated current, and this point will be described below and elsewhere herein.

Figure 5:
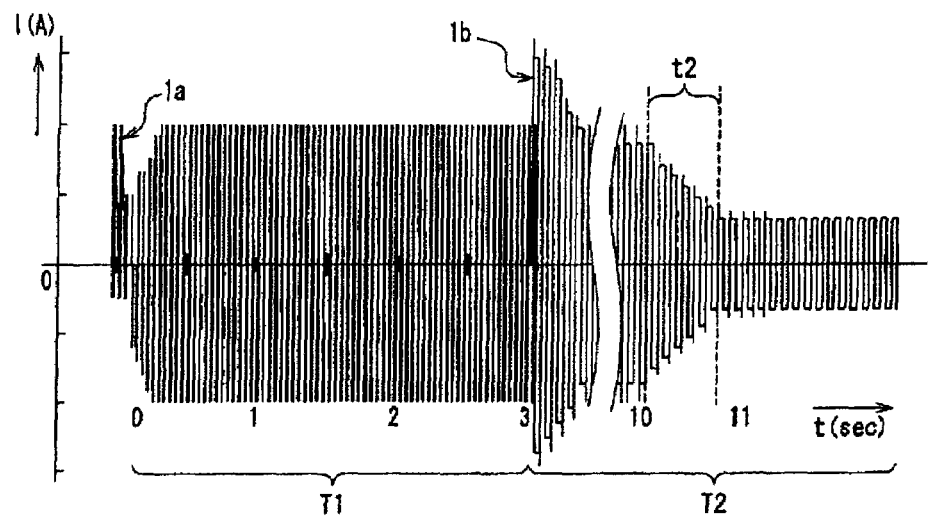
FIG. 5 is a waveform diagram of a lamp current I (A) in the case where the lamp current is not controlled when switching commutation frequencies.

As illustrated in FIG. 4, the high-frequency start period T1 is changed with certain timing to the steady commutation frequency period T2 appropriate for a lamp. In this regard, similar to the conventional high frequency ballast for a discharge lamp, also in Embodiment 1 of the present invention, the combined impedance of the lamp 6 and the choke coil L1 suddenly decreases, resulting in an excessively large current flowing when switching frequencies. Note that FIG. 5 illustrates a lamp start waveform of the ballast for a discharge lamp of Embodiment 1 of the present invention. Ib of FIG. 5 indicates the excessively large current when switching frequencies.

In Embodiment 1 of the present invention, since a current not smaller than a rated current flows, the current is not negligible as in the conventional high frequency ballast for a discharge lamp. This point will be described below and elsewhere herein.

Next, when the lamp voltage gradually increases with an increase in the temperature of the lamp electrode and a substance enclosed in a lamp bulb, the lamp voltage value signal c fed back from the voltage detecting section 22 of the commutator 2 gradually increases, and is input via the operational amplifier OP2 (resultant signal c2) to the comparator Comp and the computation section 41. Since the output signal c2 of the operational amplifier OP2 exceeds the reference voltage determined by the resistors R4 and R5, the output d of the comparator Comp goes OFF (=HIGH output). Thereby, the transistor Q1 is turned ON, so that the output of the operational amplifier OP1 is set to be a gain G (G=(R1/R2)+1) determined by the resistors R1 and R2. Therefore, the lamp current value signal b fed back from the current detecting section 21 of the commutator 2 becomes the signal b2 which is gained up by a factor of several times by the operational amplifier OP1.

As a result, the computation section 41 detects the lamp current feedback value b2, which is excessively large with respect to the first target current value, and therefore, controls the PWM control section 42 so as to reduce the lamp current so that the lamp current is changed to a second target current value (in a steady control state) corresponding to a current value not higher than a rated lamp current value. A time t2 required for the change is about one second, though it varies depending on the settings of constants of the control circuit, the states of the lamp electrode and the enclosed substance (mercury).

Thereafter, the computation section 41 is programmed to be transitioned to a steady control state with the setting of the gain G (G=(R1/R2)+1). The computation section 41 controls the lamp current value while comparing and computing the lamp voltage value signal c2 and the signal b2 fed back from the current detecting section 21, so that the lamp current value becomes optimal to the current lamp voltage.

Figure 12:
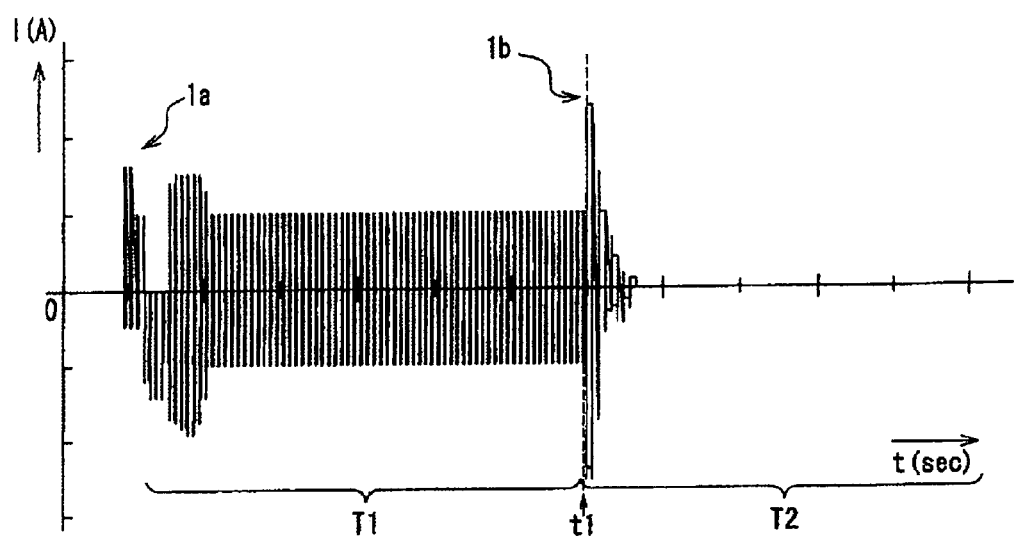
FIG. 12 is a waveform diagram of a lamp current I (A) of a conventional high-frequency start type ballast for a discharge lamp, in which the lamp current I (A) is attenuated to zero after switching from a high-frequency start period T1 to a commutation frequency period T2, so that the lamp goes out.

Here, the above-described problem arising when switching the frequencies, and way of solving the problem, will be described. As described above, the combined impedance of the lamp 6 and the choke coil L1 suddenly decreases at the timing of switching the high frequency period T1 of several tens of KHz of the high-frequency start type ballast for a discharge lamp to the steady commutation frequency period T2 of several tens of Hz to several hundreds of Hz appropriate for a lamp, so that the excessively large current Ib when switching the frequencies flows due to the counter electromotive voltage as illustrated in FIGS. 11 and 12, unavoidably resulting in a degradation in the lamp electrode. In the case of the timing of switching the high frequency period T1 at the start of lamp operation to the steady commutation frequency period T2 appropriate for the lamp, as illustrated in FIG. 11 (the conventional example) or FIG. 5, the lamp current waveform I (A) has a current waveform in which high-frequency switching drive is performed during the high frequency period T1. Therefore, at the instance when the operation enters the steady commutation period T2, the influence of the inductance which is a major component of the high-voltage generating section 3 is suddenly decreased. Therefore, the excessively large current Ib flows substantially when switching to the commutation frequency of the lamp current waveform I (A) as illustrated in FIG. 5.

The timing of changing from the high frequency period T1 to the steady commutation period T2 is previously determined, mostly based on a time (2 to 5 seconds) from the start of lamp operation, though it may be assumed to be based on the lamp current value, the voltage value, or the like. As an actual control, the switching is performed at a time determined for each lamp or ballast for a discharge lamp by a timer 411 provided in the computation section 41 composed of a microcomputer or the like as illustrated in FIG. 3.

Figure 6:
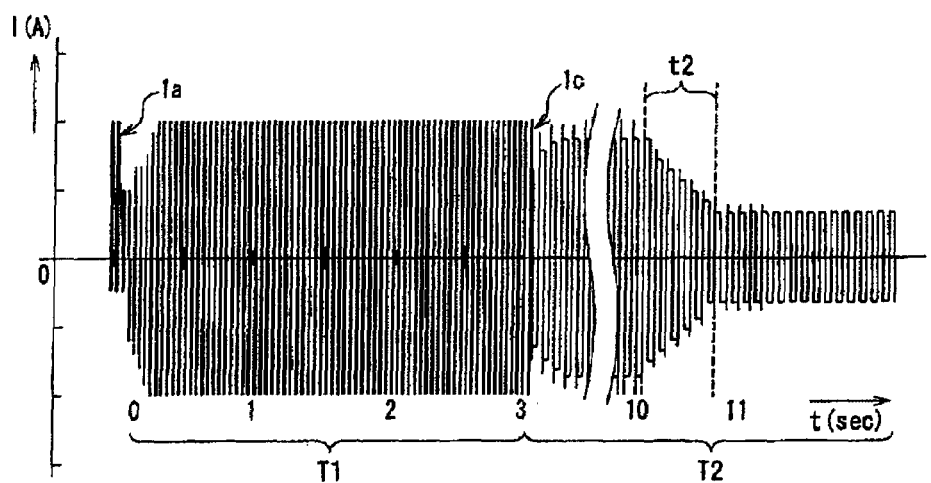
FIG. 6 is a waveform diagram of a lamp current I (A) when the lamp current is controlled to be a third target current value when switching commutation frequencies.

As illustrated in FIG. 5, the excessively large current Ib when switching the frequencies flows immediately after the end of the high frequency period T1. The signal p previously is programmed to be output from the computation section 41 with this timing, irrespective of information about the voltage value or current value of a lamp. Based on the output signal p from the computation section 41, the output signal a for a PWM control of the DC-DC converter 1 is newly set to be a third target current value Ic illustrated in FIG. 6. To achieve the target value, the output of the PWM control section 42 is changed so that the output current of the DC-DC converter 1 is reduced. Thereby, a lamp current waveform in which the excessively large current when switching to the commutation frequency is reduced considerably can be obtained as illustrated in FIG. 6.

By adjusting the third target current value Ic by conducting an experiment or the like, the lamp current waveform I (A) of FIG. 4 can be obtained, thereby making it possible to stabilize the state of a lamp at the start of lamp operation. Although the excessively large current Ib when switching the frequencies flows immediately after the end of the high frequency period T1, the third target current value Ic may be set several microseconds to several milliseconds immediately before the end of the high frequency period T1, taking into consideration a delay of control or the like.

As described above, according to Embodiment 1 of the present invention, when lamp operation is started, a current several times larger than the rated lamp current is caused to flow in accordance with a predetermined threshold voltage that is not higher than the rated lamp voltage and is set for each lamp individually, or a set value instead thereof, thereby making it possible to warm the lamp electrode rapidly. Therefore, the lamp quickly can be transitioned to a steady thermoelectron discharge state, so that a time required to increase the lamp illuminance can be reduced significantly as compared to the conventional example.

Figure 7:
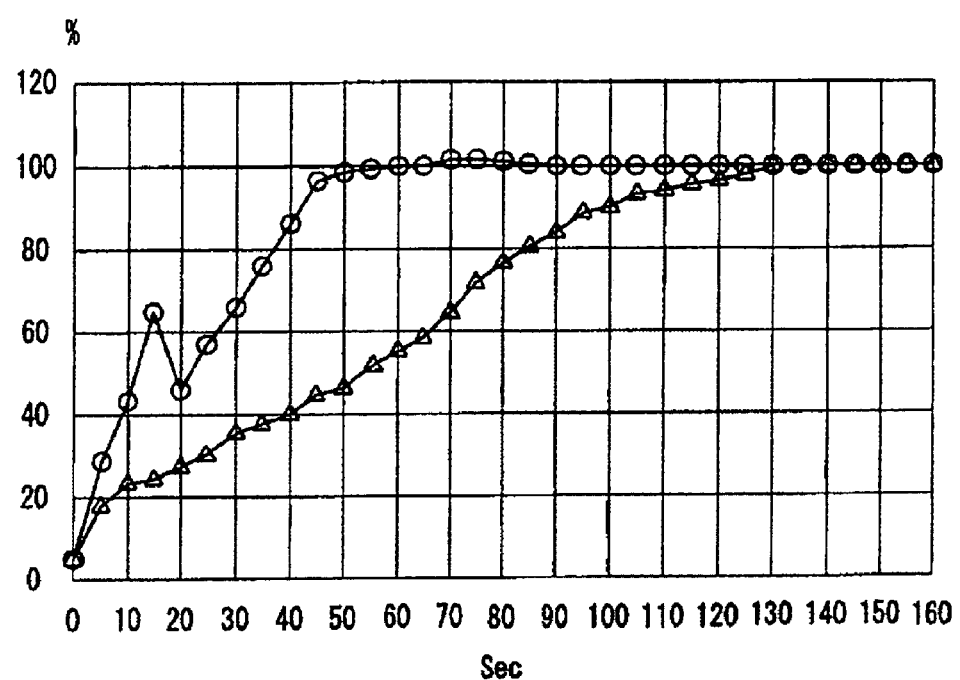
FIG. 7 is a graph illustrating a comparison in characteristics of illuminance increase from the start of lamp operation between the present invention and a conventional example.

FIG. 7 illustrates the result of comparison in the illuminance increase rate-versus-time characteristics of a lamp of about 200-W class having about a rated current of about 3 A between when the lamp was started using the conventional high frequency ballast for a discharge lamp (indicated with open triangles) and when the ballast for a discharge lamp of Embodiment 1 of the present invention was used to supply a start current of about 6 A, which is twice higher than the rated current, until the lamp voltage reaches about 25 V (indicated with open circles). According to the result, it can be seen that, whereas it took about 130 sec for the conventional ballast for a discharge lamp to achieve substantially 100% illuminance, it took about 50 sec, which is less than half of 130 sec, for the ballast for a discharge lamp of Embodiment 1 of the present invention to achieve substantially 100% illuminance.

Note that the change time t2 (FIG. 4) from the period during which a current not smaller than the predetermined rated current is caused to flow through a lamp to the period during which a current not larger than the rated lamp current is caused to flow through the lamp, substantially corresponds to a decrease in illuminance of the present invention (FIG. 7). This is because the current caused to flow through a lamp is reduced.

Further, according to Embodiment 1 of the present invention, it is possible to solve the problem with the circuit structure of the ballast for a discharge lamp such that the filter effect of the choke coil inserted in series with respect to a lamp reduces a current that is used to warm the lamp electrode immediately after the start of lamp operation, so that the lamp goes out with the timing of switching to the steady commutation frequency. Specifically, when lamp operation is started, a current several times larger than the rated lamp current is caused to flow in accordance with a predetermined threshold voltage not higher than the rated lamp voltage set for each lamp individually, or a set value instead thereof, thereby making it possible to rapidly warm the lamp electrode. Therefore, it is possible to reduce considerably the possibility that the lamp goes out when switching to the steady commutation frequency.

Furthermore, according to Embodiment 1 of the present invention, it is possible to solve the problem with the circuit structure of the ballast for a discharge lamp such that a considerably large amount of magnetic flux energy accumulated in the choke coil inserted in series with respect to a lamp during the high frequency period causes the combined impedance of the lamp and the choke coil to decrease suddenly with timing of switching from the high frequency period to the steady commutation frequency of several tens to several hundreds of Hz appropriate for the lamp, so that a counter electromotive voltage occurs, and therefore, an excessively large current flows at the time of the switching, resulting in a degradation in the lamp electrode. Specifically, by newly setting a control target value irrespective of information about the voltage or current value of a lamp with timing of switching the lamp start high frequency period to the steady commutation frequency appropriate for the lamp, an excessively large current to the lamp when switching to the commutation frequency can be reduced, thereby causing the lamp to go to a steady thermoelectron discharge state without degrading the electrode.

Figure 8:
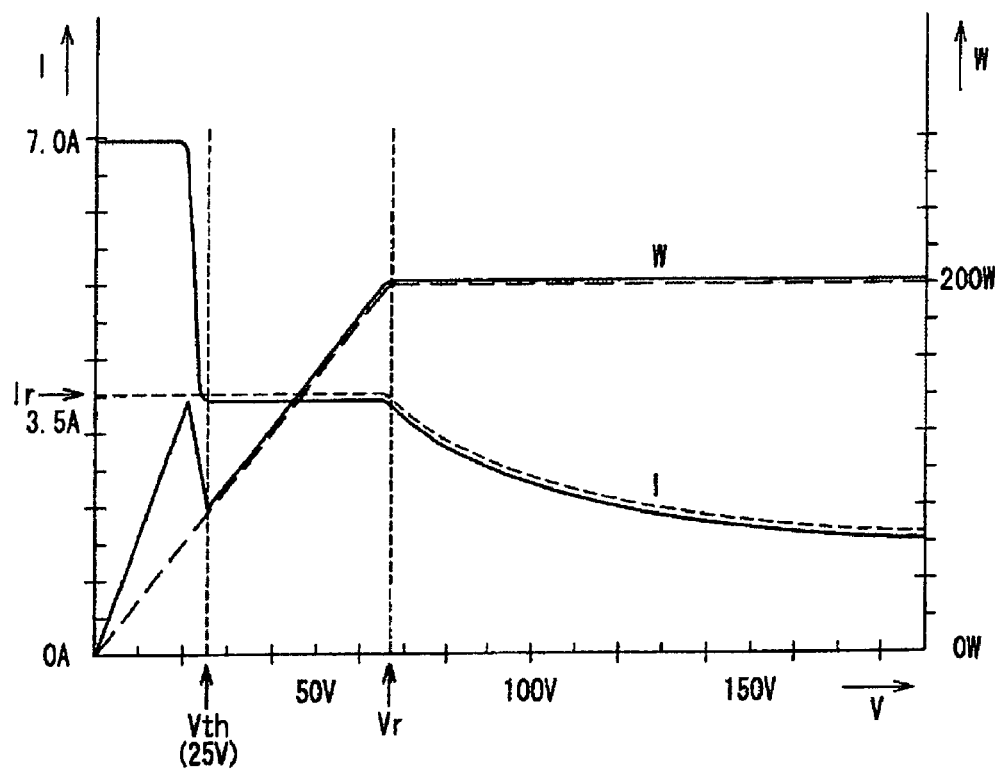
FIG. 8 is a graph illustrating a comparison between the present invention and a conventional example in terms of characteristics of a lamp current I versus a power W with respect to a lamp voltage V

Note that the rated lamp current as used herein refers to a maximum value of current that can be caused to flow in a state in which a substance enclosed in a lamp bulb (mercury, etc.) is gasified or ionized. As used herein, the rated lamp voltage refers to a minimum value of a voltage range in which a lamp can be maintained to emit light with a predetermined power. FIG. 8 illustrates a comparison of characteristics of a lamp current I versus a power W with respect to a lamp voltage V in relation to a rated lamp current (Ir) and a rated lamp voltage (Vr), between the present invention and a conventional example. The present invention is represented with a solid line, while the conventional example is represented with a dashed line.

As described above, there is a lamp voltage value that is set for each lamp individually and that can rapidly warm the lamp electrode without generating perpetual distortion, such as melt or the like, even when a current several times larger than the rated lamp current (Ir) is caused to flow, if the voltage value is not higher than the rated lamp voltage and a predetermined threshold voltage. FIG. 8 illustrates that when the lamp voltage value is less than a predetermined threshold voltage value (Vth), the lamp start current value of the present invention is about twice higher than that of the conventional example. The reference voltage determined by the resistors R4 and R5 is set so that the output signal d of the comparator Comp is reversed at the predetermined threshold voltage value (Vth). Thereby, the lamp current I is controlled to be less than the rated lamp current (Ir).

However, in practical use, the output signal d of the comparator Comp is delayed slightly with respect to a change in the lamp voltage. Therefore, it is desirable that a lamp operating experiment be conducted repeatedly so that the reversal of the output d of the comparator Comp starts at a lamp voltage value slightly lower than the predetermined threshold voltage.

Embodiment 2

Figure 9:
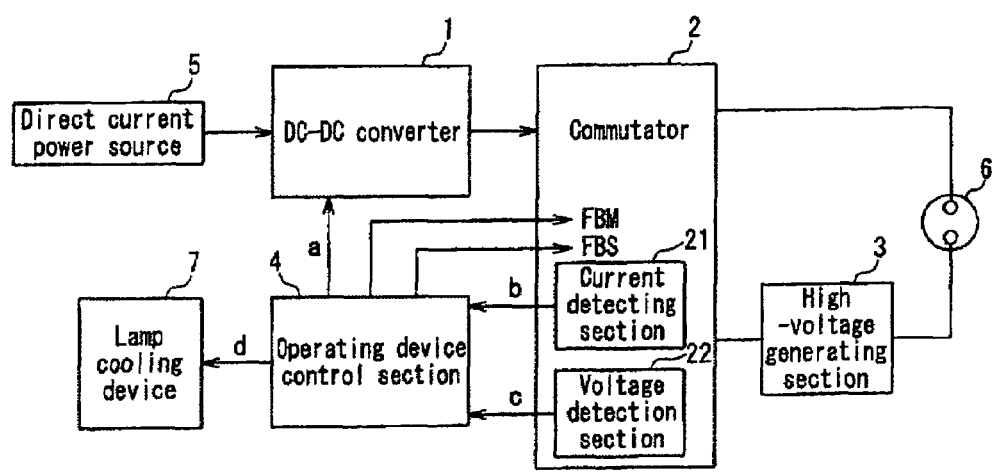
FIG. 9 is a circuit block diagram illustrating an exemplary structure of a ballast for a discharge lamp according to Embodiment 2 of the present invention.

Embodiment 2 of the present invention will be described with reference to FIGS. 9, 3, and 4. FIG. 9 illustrates a circuit block diagram of Embodiment 2 of the present invention, which is the same as that of Embodiment 1, except that a lamp cooling device 7 is provided in the circuit block of FIG. 1. A circuit block diagram of an operating device control section 4 of Embodiment 2 of the present invention is substantially the same as that of Embodiment 1 of FIG. 3, except that an output d of a comparator is used as an input of the lamp cooling device 7 of FIG. 9.

Next, an operation of the ballast for a discharge lamp of Embodiment 2 of the present invention will be described. Note that the operation of the ballast for a discharge lamp of Embodiment 2 is the same as that of Embodiment 1, except for the operation involved with the lamp cooling device 7.

During the period T1 immediately after the start of lamp operation of FIG. 4, the lamp voltage value signal c fed back from the voltage detecting section 22 of the commutator 2 has a considerably low value and is input via the operational amplifier OP2 (resultant signal c2) to the comparator Comp and the computation section 41. The output signal c2 of the operational amplifier OP2 is lower than the reference voltage determined by the resistors R4 and R5, and therefore, the output d of the comparator Comp is ON (=LOW output).

Next, when the lamp voltage gradually increases with an increase in the temperature of the lamp electrode and a substance enclosed in the lamp bulb, the lamp voltage value signal c fed back from the voltage detecting section 21 of the commutator 2 gradually increases. The lamp voltage value signal c is input via the operational amplifier OP2 resultant signal c2) to the computation section 41 and the comparator Comp. When the output signal c2 of the operational amplifier OP2 exceeds the reference voltage determined by the resistors R4 and R5, the output d of the comparator Comp goes OFF (=HIGH). Note that the reference voltage determined by the resistors R4 and R5 is a lamp voltage value that does not generate a perpetual distortion, such as melt or the like, in the lamp electrode even if a current several times larger than the rated lamp current is caused to flow, as described above. According to an experiment, it is known that the perpetual distortion, such as melt or the like, does not occur in the lamp electrode if the lamp voltage is not higher than the predetermined threshold voltage.

The output d of the comparator Comp that is switched at the predetermined threshold voltage is used to stop the lamp cooling device 7 immediately after the start of lamp operation. Specifically, a cooling fan which is provided near the lamp is stopped. In a subsequent steady state, the cooling fan is turned ON as in a typical lamp operating device.

As described above, according to Embodiment 2, similar to Embodiment 1, when lamp operation is started, a current several times larger than the rated lamp current is caused to flow in accordance with a predetermined threshold voltage that is not higher than the rated lamp voltage and is set for each lamp individually, or a set value instead thereof thereby making it possible to warm the lamp electrode rapidly. Therefore, the lamp quickly can be transitioned to a steady thermoelectron discharge state, so that a time required to increase the lamp illuminance can be reduced significantly as compared to the conventional example.

Further, by stopping a lamp cooling device immediately after the start of lamp operation, it is possible to warm the lamp electrode rapidly.

Furthermore, means of transferring a predetermined threshold voltage set for each lamp individually, or a set value instead thereof, to a lamp cooling device in which the value is to be set, is used to stop the cooling device until the lamp voltage value reaches the threshold voltage or the set value instead thereof. Thus, the lamp electrode can be warmed rapidly, and therefore it is possible to reduce considerably the possibility that the lamp goes out with the timing of switching to the steady commutation frequency.

Still furthermore, when and after the lamp voltage value reaches a voltage not lower than the set value, or the set value instead thereof, since a control state of a cooling system is transitioned to a cooling state optimal to the maintenance of the rated state of a lamp, it is possible to cause the lamp to go to a steady thermoelectron discharge without degrading the electrode.

INDUSTRIAL APPLICABILITY

The ballast for a discharge lamp of the present invention can increase the temperature of a lamp electrode quickly and sufficiently to reduce a time required to increase lamp illuminance, so that a time required to cause video to be viewable can be reduced, and therefore, is useful for operation of a projector lamp.

The invention claimed is:

1. A high-frequency start type ballast for a discharge lamp comprising:
   a direct current power source;
   a DC-DC converter for DC-DC converting a current from the direct current power source;
   a commutator for converting a direct current output from the DC-DC converter into an alternating current;
   a discharge lamp supplied with the alternating current from the commutator; and
   an operating device control section for controlling an output current of the DC-DC converter, and controlling a commutation frequency of the commutator,
   wherein the operating device control section operates the discharge lamp, at start of operating the discharge lamp, with a predetermined voltage value lower than a rated voltage of the discharge lamp and a first target current value higher than a rated current of the discharge lamp, then, at an end of a predetermined high frequency start period elapsed from the start of operating the discharge lamp, controls the commutator to switch from a commutation frequency higher than that during a steady lamp operation to a commutation frequency during the steady lamp operation, and then, after a voltage applied to the discharge lamp increases and reaches a voltage not lower than a predetermined threshold voltage lower than the rated voltage of the discharge lamp, controls the DC-DC converter so that the first target current value is switched to a second target current value not higher than the rated current of the discharge lamp.

2. The ballast for a discharge lamp according to claim 1, wherein the operating device control section controls the DC-DC converter so that a current flowing through the discharge lamp has a third target current value not higher than the second target current value, irrespective of information about a value of the current flowing through the discharge lamp and a value of the voltage applied to the discharge lamp, at a time of switching the commutation frequencies.

3. The ballast for a discharge lamp according to claim 1, wherein the operating device control section sets the first target current value to be twice or more higher than the second target current value.

4. The ballast for a discharge lamp according to claim 1, wherein
the commutator comprises a current detecting section for detecting a current flowing through the discharge lamp and a voltage detecting section for detecting the voltage applied to the discharge lamp,
the operating device control section comprises:
a variable-gain amplification section for switching gains and amplifying a voltage corresponding to the current detected by the current detecting section;
a comparator for comparing the voltage detected by the voltage detecting section with a reference voltage corresponding to the predetermined threshold voltage, and outputting a gain control signal to the variable-gain amplification section, depending on a result of comparison;
a computation section for receiving output signals from the variable-gain amplification section and the voltage detecting section, and performing a computation so that a current optimal to the voltage applied to the discharge lamp flows through the discharge lamp; and
a PWM control section for outputting a signal for performing a pulse width modulation (PWM) control with respect to the DC-DC converter, depending on an output signal from the computation section,
wherein, when the voltage detected by the voltage detecting section is not lower than the reference voltage, the comparator outputs a gain control signal for increasing a gain of the variable-gain amplification section.

5. The ballast for a discharge lamp according to claim 4, wherein the computation section comprises a timer for measuring a time elapsed from start of operating the lamp, and the predetermined high frequency start period measured with the timer is set for each discharge lamp individually, depending on a rating of the discharge lamp.

6. The ballast for a discharge lamp according to claim 1, wherein the predetermined threshold voltage is set for each discharge lamp individually, depending on a rating of the discharge lamp.

7. The ballast for a discharge lamp according to claim 1, further comprising a discharge lamp cooling device, and the operating device control section stops the discharge lamp cooling device until the voltage applied to the discharge lamp reaches the predetermined threshold voltage.

8. A method of operating a discharge lamp steadily with high frequency start, comprising the steps of:
causing the discharge lamp to operate the discharge lamp, at start of operating the discharge lamp, with a predetermined voltage value lower than a rated voltage of the discharge lamp and a first target current value higher than a rated current of the discharge lamp; and
switching, at an end of a predetermined high frequency start period elapsed from the start of operating the discharge lamp, from a commutation frequency higher than that during a steady lamp operation to a commutation frequency during the steady lamp operation, and then, after a voltage applied to the discharge lamp increases and reaches a voltage not lower than a predetermined threshold voltage lower than the rated voltage of the discharge lamp, switching the first target current value to a second target current value not higher than the rated current of the discharge lamp.

9. The method of operating a discharge lamp according to claim 8, further comprising performing a control so that a current flowing through the discharge lamp has a third target current value not higher than the second target current value, irrespective of information about a value of the current flowing through the discharge lamp and a value of the voltage applied to the discharge lamp, at a time of switching the commutation frequencies.

10. The method of operating a discharge lamp according to claim 8, wherein the first target current value is set to be twice or more higher than the second target current value.

11. The method of operating a discharge lamp according to claim 8, wherein the predetermined high frequency start period is set for each discharge lamp individually, depending on a rating of the discharge lamp.

12. The method of operating a discharge lamp according to claim 8, wherein the predetermined threshold voltage is set for each discharge lamp individually, depending on a rating of the discharge lamp.

13. The method of operating a discharge lamp according to claim 8, further comprising stopping cooling of the discharge lamp until the voltage applied to the discharge lamp reaches the predetermined threshold voltage.

* * * * *